US009946363B2

(12) United States Patent
Nagao

(10) Patent No.: US 9,946,363 B2
(45) Date of Patent: Apr. 17, 2018

(54) PROJECTOR, INTERACTIVE SYSTEM, AND INTERACTIVE CONTROL METHOD

(71) Applicant: Masafumi Nagao, Kanagawa (JP)

(72) Inventor: Masafumi Nagao, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 56 days.

(21) Appl. No.: 14/753,447

(22) Filed: Jun. 29, 2015

(65) Prior Publication Data

US 2016/0018905 A1    Jan. 21, 2016

(30) Foreign Application Priority Data

Jul. 15, 2014   (JP) .................................. 2014-145027

(51) Int. Cl.

| | |
|---|---|
| *G09G 5/00* | (2006.01) |
| *G06F 3/033* | (2013.01) |
| *G09G 5/08* | (2006.01) |
| *H04N 5/268* | (2006.01) |
| *G06T 11/60* | (2006.01) |
| *H04N 9/31* | (2006.01) |

(52) U.S. Cl.
CPC .............. *G06F 3/033* (2013.01); *G06T 11/60* (2013.01); *G09G 5/003* (2013.01); *G09G 5/006* (2013.01); *H04N 9/3179* (2013.01); *G09G 2370/06* (2013.01); *G09G 2370/12* (2013.01); *G09G 2370/20* (2013.01)

(58) Field of Classification Search
CPC ............................. H04N 9/3147; G03B 37/04
See application file for complete search history.

(56) References Cited

U.S. PATENT DOCUMENTS

| | | | | |
|---|---|---|---|---|
| 2002/0152094 | A1* | 10/2002 | Fahraeus | G06F 3/03545 705/500 |
| 2003/0065767 | A1* | 4/2003 | Pardhy | H04L 41/12 709/224 |
| 2011/0115983 | A1* | 5/2011 | Nishihata | G09G 5/006 348/705 |

(Continued)

FOREIGN PATENT DOCUMENTS

JP          2012-043250          3/2012

*Primary Examiner* — Nan-Ying Yang
(74) *Attorney, Agent, or Firm* — Harness, Dickey & Pierce, P.L.C.

(57) ABSTRACT

A projector comprising: an image acquiring unit acquiring projection images; an identification information acquiring unit acquiring identification information of a target device among source devices that provide the projections images; a projecting unit that generates a composite image collectively including the acquired projection images, and projects the composite image on a projection plane; a position coordinates detecting unit detecting position coordinates of a pointing object that operates on the plane; a detecting unit that detects a projection region of a projection image provided by the target device, by using the acquired identification information; a converting unit that, when the position coordinates of the pointing object is in the projection region of the projection image, converts the position coordinates of the pointing object to operating information on a coordinate system of the target device; and a transmitting unit that transmits the operating information to the target device.

9 Claims, 8 Drawing Sheets

(56) References Cited

U.S. PATENT DOCUMENTS

| | | | |
|---|---|---|---|
| 2013/0106908 A1* | 5/2013 | Ichieda | G06F 3/0425 345/629 |
| 2014/0176505 A1* | 6/2014 | Arai | G06F 3/0418 345/175 |
| 2014/0189674 A1 | 7/2014 | Nagao | |
| 2015/0138512 A1 | 5/2015 | Nagao | |

* cited by examiner

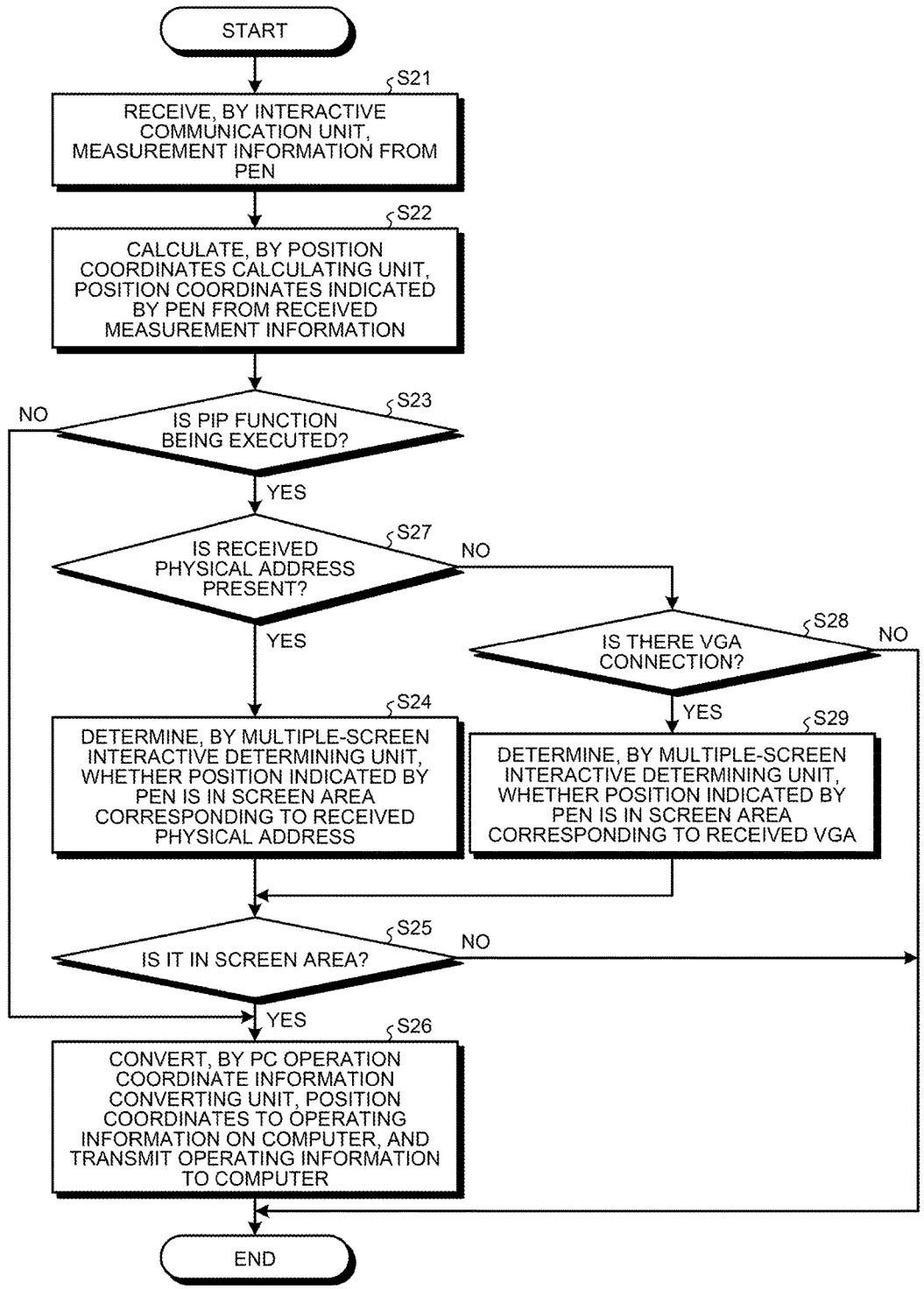

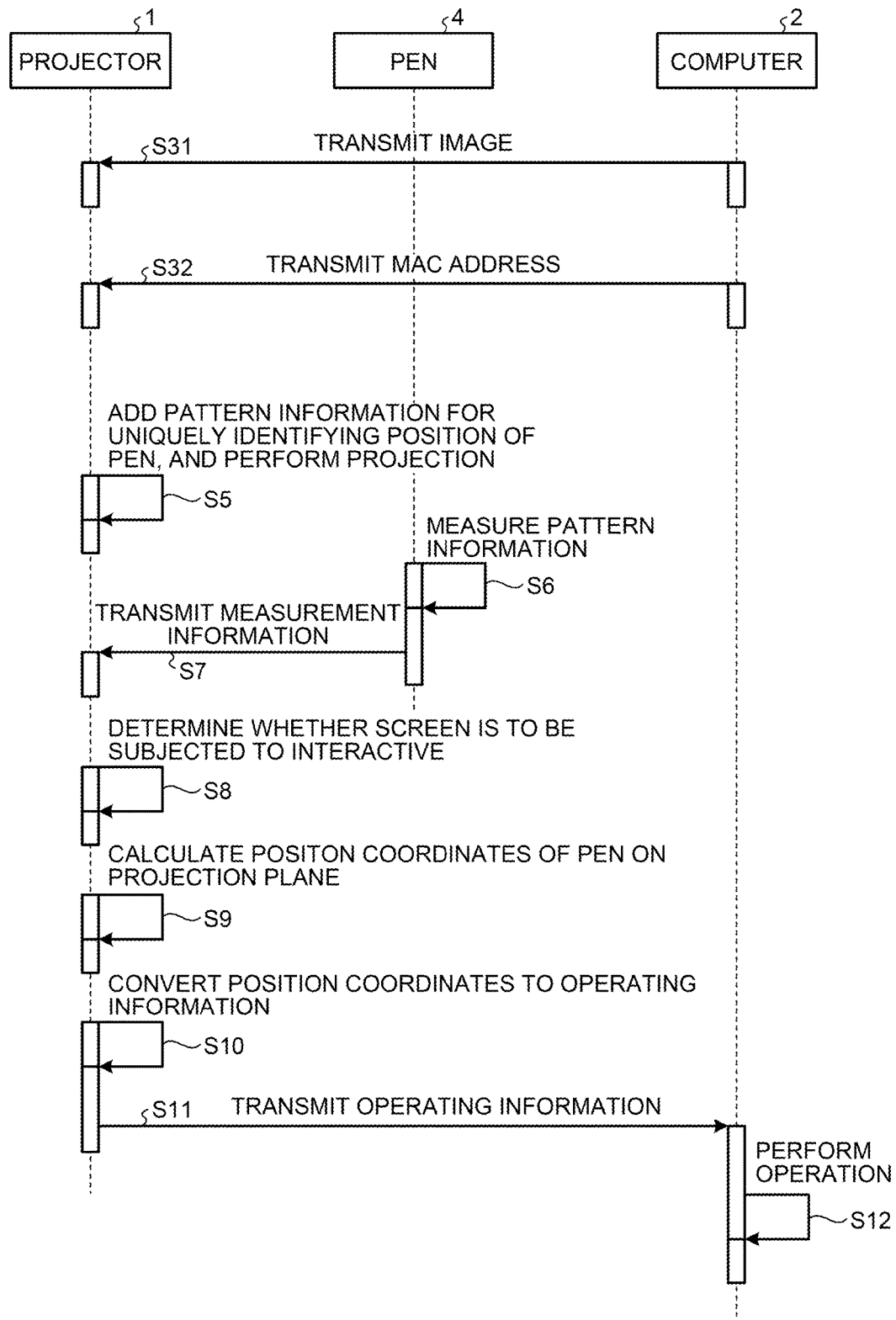

PROJECTOR, INTERACTIVE SYSTEM, AND INTERACTIVE CONTROL METHOD

CROSS-REFERENCE TO RELATED APPLICATIONS

The present application claims priority to and incorporates by reference the entire contents of Japanese Patent Application No. 2014-145027 filed in Japan on Jul. 15, 2014.

BACKGROUND OF THE INVENTION

1. Field of the Invention

The present invention relates to a projector, an interactive system, and an interactive control method.

2. Description of the Related Art

In recent years, there is a known interactive system that detects operations on a screen projected by a projector (image projection apparatus), and enables operations of apparatuses, such as the projector and personal computers. In the interactive system, if a user operates a projection plane by an electronic pen, a pen, a finger, or the like, a cursor, a pointer, or the like is displayed and moved on the projection plane in accordance with the operation. Further, in the interactive system, if a user performs a touch operation at a desired position on the projection plane, the apparatus is controlled so as to perform an operation, such as to display an operation menu or to switch a display image, in accordance with the position at which the touch operation is performed.

Japanese Laid-open Patent Publication No. 2013-097177 discloses a display device that, while multiple images are being displayed, enables processing on the displayed multiple images on the basis of a designated position on a display screen. In the display device, a projector side has a function to draw characters and diagrams, and is able to perform interactive control to draw characters and diagrams across the multiple screens by processing operating information.

In conventional interactive systems including the technology disclosed in Japanese Laid-open Patent Publication No. 2013-097177, if a projection image (controllable image) available for interactive control and a projection image (uncontrollable image) unavailable for interactive control are simultaneously projected as a single projection image, it is difficult to perform interactive control with accuracy.

Specifically, a controllable image generated by a personal computer that performs interactive control and an uncontrollable image generated by a DVD player that does not perform interactive control are provided to a projector, for example. The projector projects both of the images as a single image in a picture-in-picture display mode on a projection plane. In this case, as an interactive operation performed by using a pointing object, such as a pen or a finger, it is necessary to detect only an interactive operation performed on the controllable image as a valid interactive operation. Further, it is necessary to detect an interactive operation performed on the uncontrollable image as an invalid interactive operation.

However, on the projector side that projects the image in the picture-in-picture mode, it is difficult to distinguish between the controllable image and the uncontrollable image. Therefore, a conventional interactive system has a disadvantage in that it performs interactive control in accordance with an interactive operation on the uncontrollable image. Therefore, it is difficult to perform interactive control with accuracy.

In view of the above issues, there is a need to provide a projector, an interactive system, and an interactive control method capable of performing interactive control with accuracy.

SUMMARY OF THE INVENTION

It is an object of the present invention to at least partially solve the problems in the conventional technology.

According to the present invention, there is provided a projector comprising: an image acquiring unit that acquires a plurality of projection images; an identification information acquiring unit that acquires identification information for identifying a control target device, which is a source device subjected to interactive control, among a plurality of source devices that provide the projections images; a projecting unit that generates a composite image, in which the acquired projection images are collected into a single image, and projects the composite image on a projection plane; a position coordinates detecting unit that detects position coordinates of a pointing object that operates on the projection plane; a detecting unit that detects a projection region of a projection image provided by the control target device in the composite image, by using the acquired identification information; a converting unit that, when the position coordinates of the pointing object detected by the position coordinates detecting unit is in the projection region of the projection image provided by the control target device detected by the detecting unit, converts the position coordinates of the pointing object to operating information on a coordinate system of the control target device; and a transmitting unit that transmits the operating information to the control target device.

The present invention also provides an interactive system comprising: an image acquiring unit that acquires a plurality of projection images; an identification information acquiring unit that acquires identification information for identifying a control target device, which is a source device subjected to interactive control, among a plurality of source devices that provide the projections images; a projecting unit that generates a composite image, in which the acquired projection images are collected into a single image, and projects the composite image on a projection plane; a position coordinates detecting unit that detects position coordinates of a pointing object that operates on the projection plane; a detecting unit that detects a projection region of a projection image provided by the control target device in the composite image, by using the acquired identification information; a converting unit that, when the position coordinates of the pointing object detected by the position coordinates detecting unit is in the projection region of the projection image provided by the control target device detected by the detecting unit, converts the position coordinates of the pointing object to operating information on a coordinate system of the control target device; and a transmitting unit that transmits the operating information to the control target device.

The present invention also provides an interactive control method comprising acquiring, by an image acquiring unit, a plurality of projection images; acquiring, by an identification information acquiring unit, identification information for identifying a control target device, which is a source device subjected to interactive control, among a plurality of source devices that provide the projections images; generating, by a projecting unit, a composite image, in which the acquired projection images are collected into a single image; projecting, by the projecting unit, the composite image on a projection plane; detecting, by a position coordinates detecting unit, position coordinates of a pointing object that operates on the projection plane; detecting, by a detecting unit, a projection region of a projection image provided by the control target device in the composite image, by using the acquired identification information; converting, by a converting unit and when the position coordinates of the pointing object detected at the detecting is in the projection region of the projection image provided by the control target device detected at the detecting, the position coordinates of the pointing object to operating information on a coordinate system of the control target device; and transmitting, by a transmitting unit, the operating information to the control target device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a flowchart illustrating the flow of an operation performed by a projector provided in an interactive system of a second embodiment of the present invention; and FIG. 9 is a sequence diagram illustrating operations in each of devices provided in an interactive system of a third embodiment of the present invention.

DETAILED DESCRIPTION OF THE PREFERRED EMBODIMENTS

Exemplary embodiments of an interactive system according to the disclosed technology will be described in detail below with reference to the accompanying drawings.

First Embodiment

System Configuration

Figure 1:
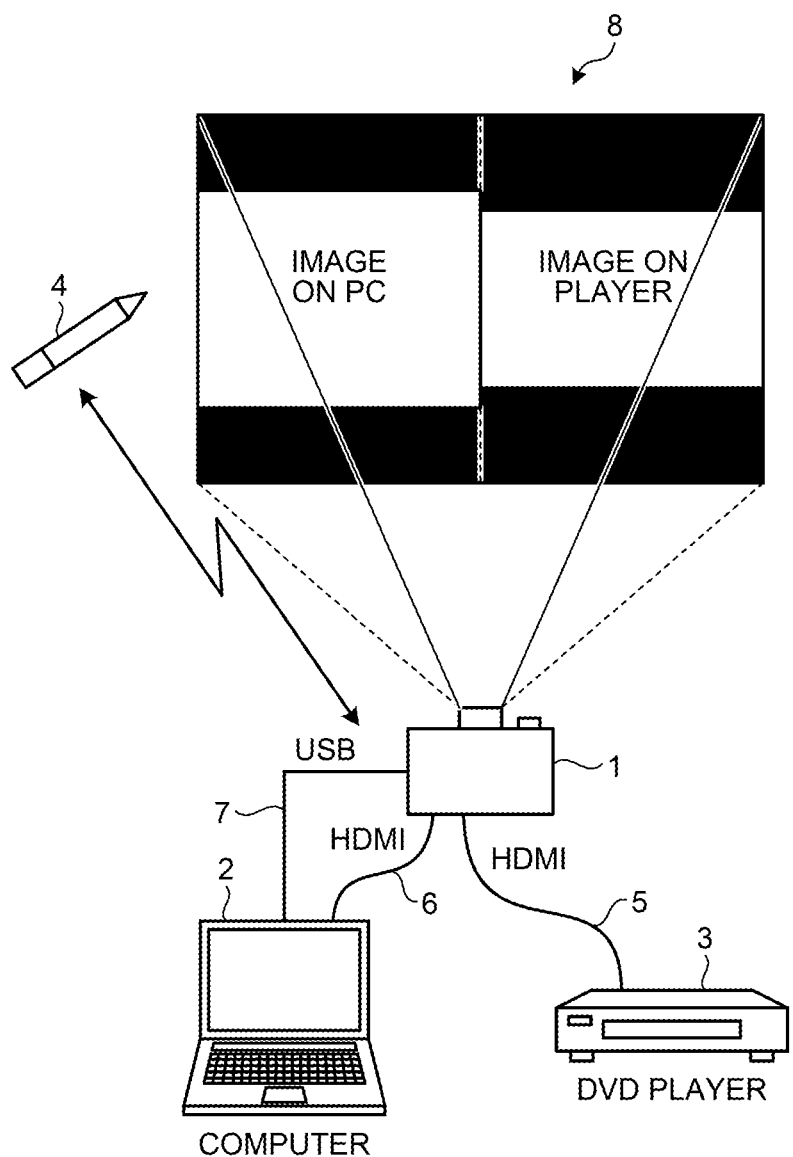
FIG. 1 is a system configuration diagram of an interactive system of a first embodiment of the present invention.

FIG. 1 is a system configuration diagram of an interactive system of a first embodiment. For example, the interactive system of the first embodiment includes a projector 1, a personal computer 2, a DVD player 3, and a pen 4.

The projector 1 and the personal computer 2 are connected to each other via a video cable 6, such as an HDMI (registered trademark) cable, for inputting a projection image (controllable image) available for interactive control. HDMI stands for High Definition Multimedia Interface. In this example, the personal computer 2 is an example of a control target device. Further, the projector 1 and the personal computer 2 are connected to each other through a wire cable 7, such as a USB cable, for transmitting and receiving operating information. USB stands for Universal Serial Bus. The operating information may be transmitted and received through near field communication using Bluetooth (registered trademark) or the like.

Similarly, the projector 1 and the DVD player 3 are connected to each other via a video cable 5, such as an HDMI cable, for inputting a projection image (uncontrollable image) unavailable for interactive control.

The projector 1 adds pattern information for specifying an operating position of the pen 4 on a projection plane 8 to a projection image, and projects the projection image on the projection plane 8. The pen 4 measures the pattern information when operated on the projection plane 8, and transmits measurement information to the projector 1. The projector 1 detects a coordinate position and an operating direction of the pen 4 on the projection plane 8 by using the measurement information transmitted by the pen 4, performs conversion to operating information, and transmits the operating information to the personal computer 2. The personal computer 2 performs an interactive operation, such as to display an operation menu or to switch a display image, in accordance with the operating information. Therefore, it is possible to perform interactive control to control operations of the personal computer 2 by operating the projection plane 8 with a pointing object, such as the pen 4.

Hardware Configuration of Projector

Figure 2:
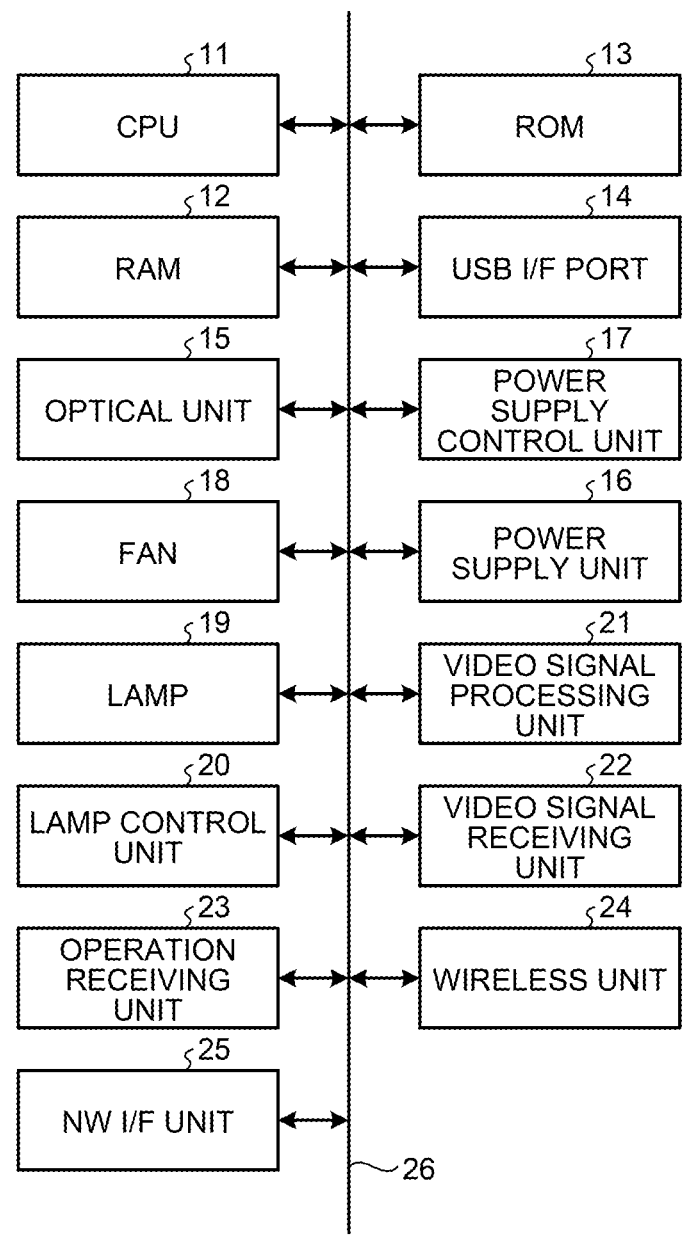
FIG. 2 is a hardware configuration diagram of a projector provided in the interactive system of the first embodiment.

FIG. 2 is a hardware configuration diagram of the projector 1. The projector 1 includes a central processing unit (CPU) 11, a random access memory (RAM) 12, a read only memory (ROM) 13, an USB interface (I/F) port 14, an optical unit 15, a power supply unit 16, a power supply control unit 17, a fan 18, a lamp 19, and a lamp control unit 20. The projector 1 further includes a video signal processing unit 21, a video signal receiving unit 22, an operation receiving unit 23, a wireless unit 24, and a network interface unit (NW I/F unit) 25. The CPU 11 to the NW I/F unit 25 are connected to one another via a bus line 26.

The CPU 11 executes an "interactive program for the projector 1" to control operations of the projector 1. The RAM 12 provides a working area or the like of the CPU 11. The ROM 13 stores therein the interactive program executed by the CPU 11 and data needed to execute the interactive program. The USB I/F port 14 is a port for connecting a USB cable. The optical unit 15 is a section that generates an image, and is a DMD (registered trademark) or color wheel in the case of a DLP (registered trademark) projector. DLP stands for Digital Light Processing. DMD stands for Digital Micromirror Device.

The power supply unit 16 supplies power to the projector 1. The power supply control unit 17 controls power supply to the power supply unit 16. The fan 18 cools the main body of the projector 1. The lamp 19 generates light as a light source. The lamp control unit 20 is a ballast that controls the lamp 19. The video signal processing unit 21 is a video signal port, such as a D-subminiature (D-Sub) connector, an HDMI connector, or a video connector, for each type of video input. The video signal processing unit 21 receives and processes a video signal input from the video signal port. The operation receiving unit 23 is an operation key, for example, and receives an operation from a user. The wireless unit 24 receives information from the pen 4 by performing infrared wireless communication or wireless communication based on the Bluetooth communication standard, for example. The NW I/F unit 25 transmits and receives information via a network, such as a LAN. LAN stands for Local Area Network.

Hardware Configuration of Pen

Figure 3:
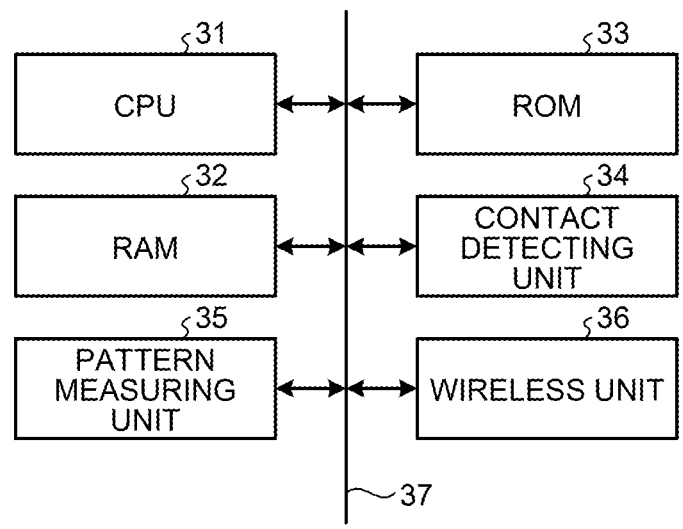
FIG. 3 is a hardware configuration diagram of a pen used in the interactive system of the first embodiment.

FIG. 3 is a hardware configuration diagram of the pen 4. As illustrated in FIG. 3, the pen 4 includes a CPU 31, a RAM 32, a ROM 33, a contact detecting unit 34, a pattern measuring unit 35, and a wireless unit 36. The CPU 31 to the wireless unit 36 are connected to one another via a bus line 37. The CPU 31 executes an "interactive program for the pen 4" to control operations of the pen 4. The RAM 32 provides a working area or the like of the CPU 31. The ROM 33 stores therein the interactive program executed by the CPU 31 and data needed to execute the interactive program. The contact detecting unit 34 is a sensor that detects the press of a pen tip in contact with the projection plane 8. The pattern measuring unit 35 measures pattern information for specifying the position of the pen 4 projected by the projector 1 when the contact detecting unit 34 detects contact of the pen tip on the projection plane 8. The wireless unit 36 transmits unique identification information on the pen 4, measurement information on the pattern information, and the like to the projector 1 by using infrared wireless communication or wireless communication based on the Bluetooth communication standard, for example.

Assignment of CEC Physical Address

Figure 4:
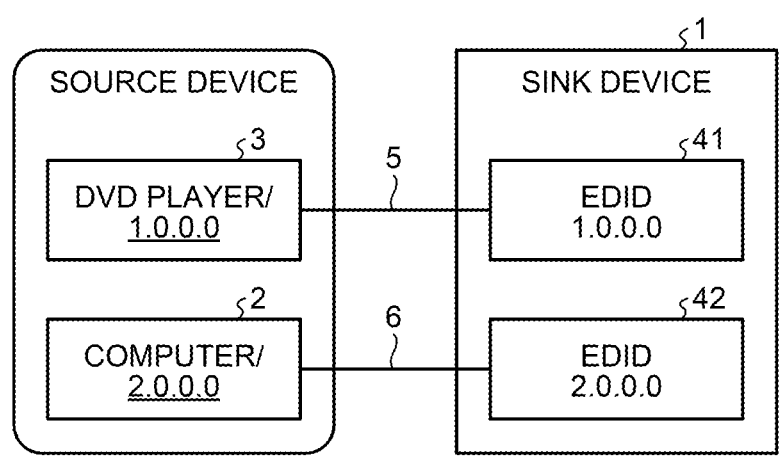
FIG. 4 is a diagram for explaining assignment of CEC physical addresses.

As illustrated in FIG. 4, the projector 1 is assumed as a "sink device", and the personal computer 2 and the DVD player 3 are assumed as "source devices". Assignment of a CEC physical address when the sink device and the source devices are connected through HDMI cables will be described below. CEC stands for Consumer Electronics Control.

Each of the HDMI cables 5 and 6 that connect the sink device and the source devices includes a content transmission path for transmitting video signals and audio signals from the source device to the sink device in one direction, and a control signal transmission path for transmitting control signals (control data) bidirectionally. The control signal transmission path serves as a transmission path for a display data channel (DDC) and CEC. In the DDC, Extended Display Identification Data (EDID), in which the performance and functions, such as resolution, of the sink device is written, is transmitted. The CEC implements a function to control the sink device and the source devices that are connected through the HDMI cables 5 and 6. For example, if a television receiver and a DVD player are connected to each other, it is possible to control the DVD player, such as "video replay", only by a remote controller (remote) of the television receiver. To implement this function, the interactive system of the embodiment uses an address (physical address) indicating a physical connection relation between the sink device and the source devices. In this example, a case will be described in which a physical address is used. However, as long as it is possible to identify a source device, unique identification information, such as a MAC address or an address that is assigned to the source device by the sink device, may be used. MAC address is an abbreviation of "Media Access Control address".

Specifically, each of the source devices connected to the sink device acquires a physical address that varies depending on a connected input terminal. For example, it is assumed that the DVD player 3 is connected to a first HDMI terminal of the projector 1 serving as the sink device, and the personal computer 2 is connected to a second HDMI terminal of the projector 1. In this case, the DVD player 3 connected to the first HDMI terminal acquires a physical address of, for example, "1.0.0.0" from the projector 1. Further, the personal computer 2 connected to the second HDMI terminal acquires a physical address of, for example, "2.0.0.0" from the projector 1. The projector 1 stores the physical addresses acquired by the personal computer 2 and the DVD player 3 in EDIDs 41 and 42 stored in a storage unit, such as a registry.

Functional Blocks of Projector and Pen

Figure 5:
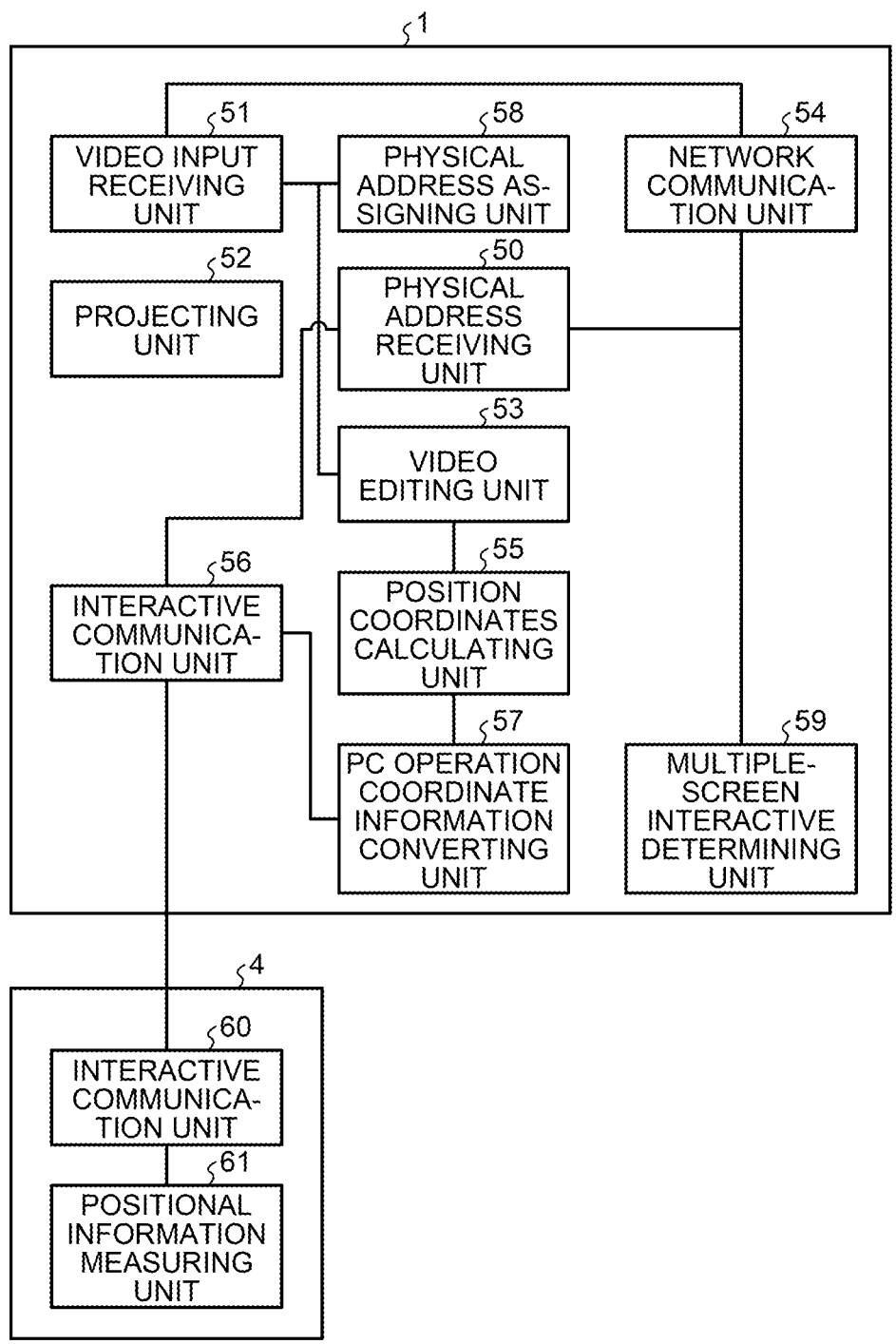
FIG. 5 is a functional block diagram of functions implemented by a CPU of the projector provided in the interactive system of the first embodiment by executing an interactive program for the projector.

FIG. 5 is a functional block diagram of functions implemented by the CPU 11 of the projector 1 by executing the interactive program for the projector 1. Also, FIG. 5 is a functional block diagram of functions implemented by the CPU 31 of the pen 4 by executing the interactive program for the pen 4. Functional blocks of the projector 1 are a physical address receiving unit 50 to a multiple-screen interactive determining unit 59. Functional blocks of the pen 4 are an interactive communication unit 60 and a positional information measuring unit 61.

Incidentally, in this example, it is assumed that the physical address receiving unit 50 to the multiple-screen interactive determining unit 59 of the projector 1 and the interactive communication unit 60 and the positional information measuring unit 61 of the pen 4 are realized by software; however, all or part of the above functions may be realized by hardware.

Further, the interactive programs of the projector 1 and the pen 4 may be provided by being recorded in a computer-readable recording medium, such as a compact disk (CD)-ROM or a flexible disk (FD), in a computer-installable or a computer-executable file format. Further, the interactive programs may be provided by being recorded in a computer-readable recording medium, such as CD-recordable (CD-R), a DVD, a Blu-ray Disc (registered trademark), or a semiconductor memory. DVD stands for Digital Versatile Disk. Furthermore, the interactive programs may be provided by being installed via a network, such as the Internet. Moreover, the interactive programs may be provided by being incorporated in a ROM or the like in the apparatus in advance.

In FIG. 5, the projector 1 includes the physical address receiving unit 50, a video input receiving unit 51, a projecting unit 52, a video editing unit 53, a network communication unit 54, a position coordinates calculating unit 55, an interactive communication unit 56, a PC operation coordinate information converting unit 57, a physical address assigning unit 58, and the multiple-screen interactive determining unit 59.

The video input receiving unit 51 is an example of an image acquiring unit. The physical address receiving unit 50 is an example of an identification information acquiring unit. The multiple-screen interactive determining unit 59 is an example of a detecting unit. The PC operation coordinate information converting unit 57 is an example of a converting unit. The interactive communication unit 56 is an example of a transmitting unit.

The physical address receiving unit 50 receives a physical address transmitted from the personal computer 2 as a target of an interactive function. The video input receiving unit 51 receives video input that is input via an HDMI (registered trademark), a VGA, or a network. VGA stands for Video Graphics Array. The projecting unit 52 projects a video signal and pattern information for specifying the position of the pen 4 on the projection plane 8. The video editing unit 53 performs an editing process, such as a magnification change, on an image to be projected. The network communication unit 54 transmits and receives information to and from other devices, such as the personal computer 2 and the DVD player 3, via a network.

The position coordinates calculating unit 55 calculates position coordinates (positional information) of the pen 4 on the projection plane 8 by using measurement information transmitted from the pen 4 that has measured the pattern information. The interactive communication unit 56 transmits and receives information on an interactive function between the pen 4 and the personal computer 2. The PC operation coordinate information converting unit 57 converts the calculated position coordinates of the pen 4 to operating information on the personal computer 2, and transmits the operating information to the personal computer 2 via the interactive communication unit 56. The physical address assigning unit 58 assigns a physical address for the above described CEC. The multiple-screen interactive determining unit 59 determines a screen on which the interactive function is executed, based on the received physical address.

Meanwhile, the positional information measuring unit 61 of the pen 4 measures pattern information superimposed on a projection image projected on the projection plane 8 pointed by the pen 4, and generates measurement information. The interactive communication unit 60 transmits the measurement information to the projector 1.

Operation Between Devices

Figure 6:
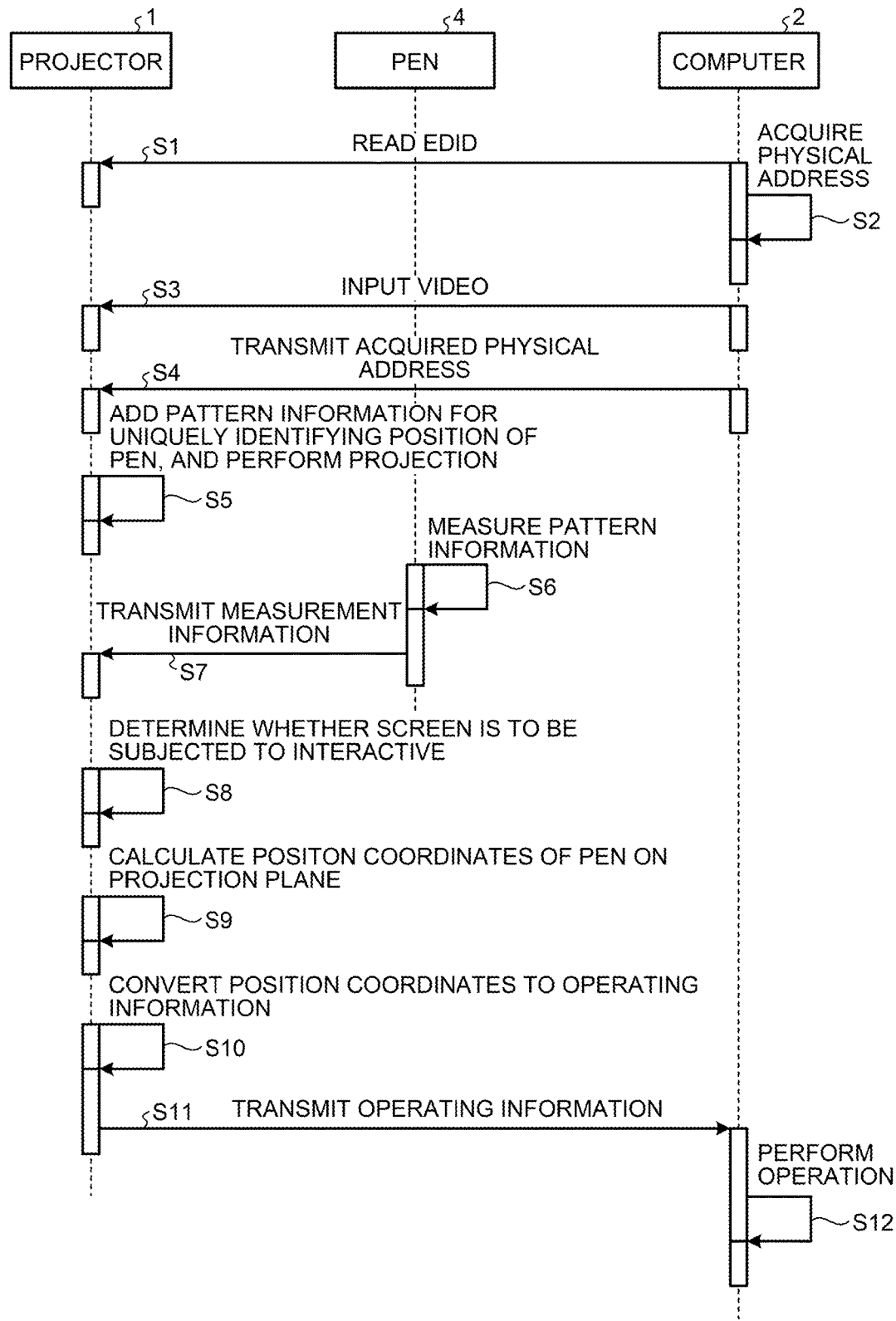
FIG. 6 is a sequence diagram illustrating operations in each of devices provided in the interactive system of the first embodiment when a contact operation is performed on a projection plane.

FIG. 6 is a sequence diagram illustrating operations in each of the devices when a contact operation is performed on the projection plane 8. In FIG. 6, if the personal computer 2 is connected to the projector 1 via the video cable 6, the personal computer 2 reads the EDID 42 illustrated in FIG. 4 at Step S1. At Step S2, the personal computer 2 acquires the assigned physical address ("2.0.0.0"). At Step S3, the personal computer 2 inputs a video signal to the projector 1. At Step S4, the personal computer 2 returns the acquired physical address to the projector 1 via the interactive communication unit 56.

At Step S5, the projector 1 projects a projection image, on which pattern information for unambiguously identifying the position of the pen 4 is superimposed, on the projection plane 8. If the pen 4 detects a contact of the pen tip to the projection plane 8 by being operated on the projection plane 8, the pen 4 measures the pattern information projected by the projector 1 at Step S6. At Step S7, the pen 4 transmits measurement information on the pattern information to the projector 1.

If the projector 1 collectively projects a plurality of screens as a single screen as in a picture-in-picture display mode or the like, the projector 1 determines an image provided to an input terminal corresponding to the received physical address as an image for interactive control (controllable image). Therefore, at Step S8, the projector 1 recognizes the image provided to the input terminal corresponding to the received physical address as the controllable image (determines whether or not a screen is to be subjected to interactive control).

Subsequently, at Step S9, the projector 1 calculates current position coordinates of the pen 4 on the projection plane 8 from the measurement information received from the pen 4. Further, the projector 1 compares the calculated position coordinates of the pen 4 and each of the coordinates of a projection region of a projection image for interactive control (interactive control projection image) projected on the projection plane 8. If the position coordinates of the pen 4 is in the projection region of the interactive control projection image, the projector 1 converts the current position coordinates of the pen 4 to the coordinate system of the personal computer 2 at Step S10. At Step S11, the projector 1 transmits, as operating information, the information converted to the coordinate system of the personal computer 2 to the personal computer 2 (converts the position coordinates to the operating information and transmits the operating information).

At Step S12, the personal computer 2 reflects the operating information received from the projector 1 in interactive control, such as movement, click, or touch of a cursor. At this time, if a drawing function is enabled in the personal computer 2, a character, a diagram, or the like is subjected to a drawing process and projected. Therefore, when a composite image, in which a plurality of images are collected in a single screen in a picture-in-picture display mode, is projected, it is possible to perform interactive control in accordance with the operation of the pen 4 on the controllable image.

In contrast, if the current position coordinates of the pen 4 indicates the coordinates of a projection region of an image (uncontrollable image) provided via an input terminal that does not correspond to the physical address received from the personal computer 2, the projector 1 stops the operation of converting the current position coordinates of the pen 4 to the coordinate system of the personal computer 2 (that is, the operation of generating the operating information). Therefore, if a plurality of images are collectively projected on a single screen in a picture-in-picture display mode, it is possible to prevent a failure (false operation) in which interactive control is performed when the pen 4 is operated on the uncontrollable image.

Operation Performed by Projector

Figure 7:
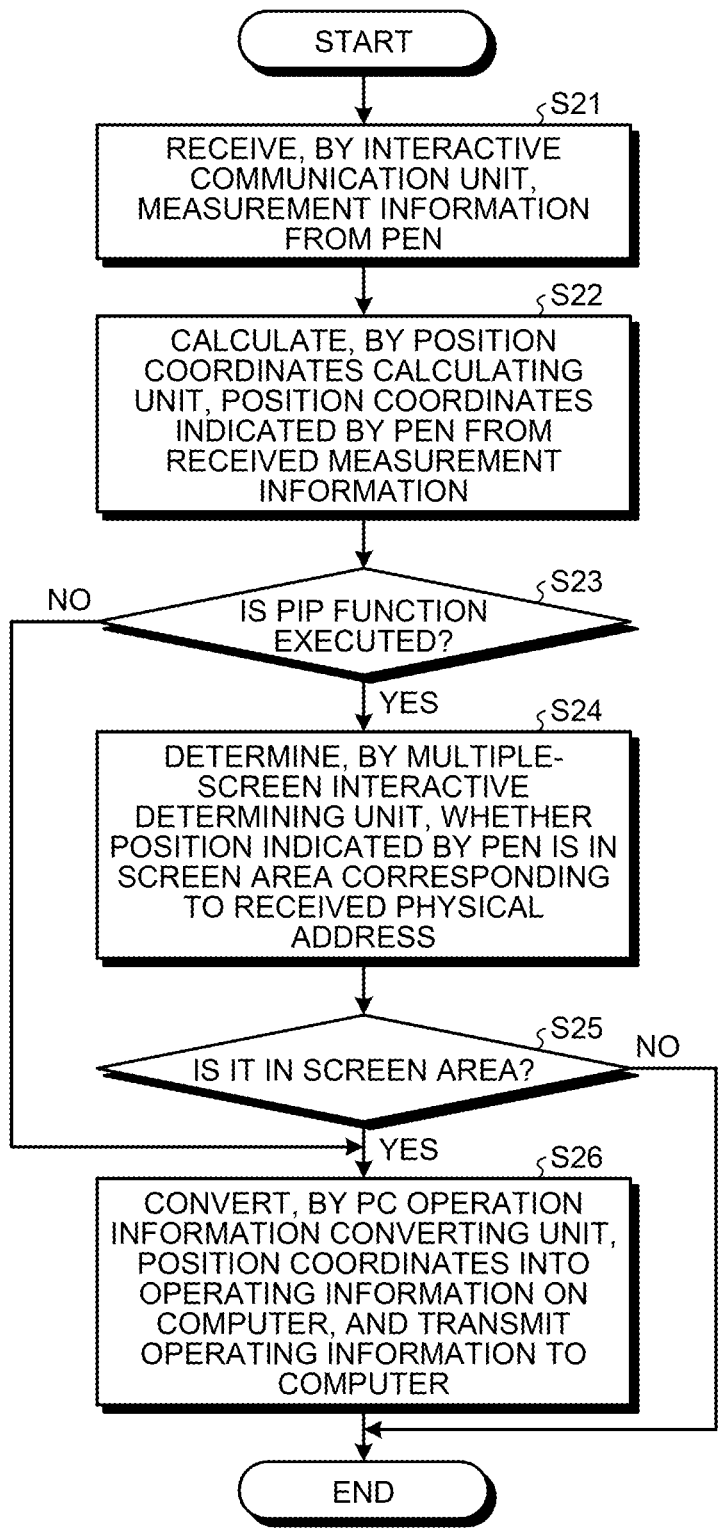
FIG. 7 is a flowchart illustrating the flow of a specific operation performed by the projector provided in the interactive system of the first embodiment.

FIG. 7 is a flowchart illustrating the flow of a specific operation performed by the projector 1. At Step S21, the interactive communication unit 56 illustrated in FIG. 5 receives the measurement information from the pen 4. At Step S22, the position coordinates calculating unit 55 calculates the current position coordinates of the pen 4 on the projection plane 8 by using the received measurement information. At Step S23, the multiple-screen interactive determining unit 59 determines whether or not a composite image, in which a plurality of images are collected in a single screen as in a picture-in-picture display mode, is projected (determine whether or not a picture-in-picture (PIP) function is executed). If the multiple-screen interactive determining unit 59 determines that a plurality of images are collectively projected on a single screen (YES at Step S23), the process proceeds to Step S24. If the multiple-screen interactive determining unit 59 determines that a single image is projected (that is, a single source is used) (NO at Step S23), the process proceeds to Step S26.

At Step S26, projection of a single image means that a current projection image is an image generated by an apparatus, such as the personal computer 2, that is a target of interactive control. Therefore, the PC operation coordinate information converting unit 57 generates operating information, which is information obtained by converting the calculated position coordinates to the coordinate system of the personal computer 2, and transmits the generated operating information to the personal computer 2. Thus, the process in the flowchart in FIG. 7 is completed. Consequently, it is possible to perform interactive control on the personal computer 2 by an operation on the projection image.

In contrast, if a plurality of images are collectively projected on a single screen, a projection image includes a plurality of input images. Therefore, it is necessary to determine which of the images is a basis of interactive control. Therefore, when the process proceeds to Step S24, the multiple-screen interactive determining unit 59 recognizes, as an image for interactive control (controllable image), a projection image that is input via an input terminal corresponding to the physical address received from the personal computer 2.

An apparatus that performs the interactive control transmits the assigned physical address to the projector 1 (see Step S4 in FIG. 6), and other apparatuses do not transmit the physical addresses to the projector 1. Specifically, in this example, the personal computer 2 transmits the physical address to the projector 1, and the DVD player 3 does not transmit the physical address to the projector 1. Therefore, the projector 1 can determine which of the projection images input to the input terminals is to be subjected to interactive control, from the received physical address.

At Step S25, the multiple-screen interactive determining unit 59 determines whether or not the calculated position coordinates of the pen 4 is on the coordinates of a projection region of the controllable image (whether or not the operating position of the pen 4 is in the projection region of the controllable image). If it is determined that the operating position of the pen 4 is out of the projection region of the controllable image (NO at Step S25), the process in the flowchart in FIG. 7 is terminated. Therefore, interactive control is not performed.

In contrast, if it is determined that the operating position of the pen 4 is within the projection region of the controllable image (YES at Step S25), the process proceeds to Step S26. At Step S26, the PC operation coordinate information converting unit 57 generates operating information, which is information obtained by converting the calculated position coordinates of the pen 4 to the coordinate system of the personal computer 2, and transmits the operating information to the personal computer 2. Therefore, it is possible to perform the interactive control on the personal computer 2.

As can be seen from the foregoing, in the interactive system of the first embodiment, an apparatus (in the above example, the personal computer 2) to be subjected to interactive control transmits an assigned physical address to the projector 1, and other apparatuses do not transmit physical addresses to the projector 1. The projector 1 distinguishes an interactive control projection image input from the personal computer 2 from among projection images input to input terminals, on the basis of the physical address. If an operation of the pen 4 is detected on the coordinates corresponding to the projection region of the projection image distinguished as above, the projector 1 converts the position coordinates of the pen 4 to operating information on the coordinate system of the personal computer 2, and transmits the operating information to the personal computer 2.

Therefore, even when a plurality of images are collectively projected on a single screen, it is possible to distinguish between an interactive control projection image and other projection images. Consequently, it is possible to perform interactive control only when a pointing object, such as the pen 4, is operated on the interactive control projection image. Therefore, it is possible to perform interactive control with accuracy.

Second Embodiment

An interactive system of a second embodiment will be described below. The above described first embodiment is an example, in which the personal computer 2 and the DVD player 3 are connected to the projector 1 via the HDMI cables 5 and 6. By connecting the projector 1 and each of the apparatuses via the HDMI cables, physical addresses are assigned to the source devices, such as the personal computer 2 and the DVD player 3. However, if the source device is connected via a cable other than the HDMI cable, a physical address is not assigned. Therefore, it becomes difficult for the projector 1 to determine whether or not a projection image input to the input terminal is an interactive control projection image.

Therefore, an interactive system of a second embodiment of the present invention is configured such that when a projection image is input via a video input terminal other than an HDMI input terminal, the projector 1 recognizes a projection image input via the video input terminal other than the HDMI input terminal as an interactive control projection image, and performs interactive control. The second embodiment as described below differs from the first embodiment as described above only in this point. Therefore, only the difference will be described below, and the same explanation will not be repeated.

FIG. 8 is a flowchart illustrating the flow of a specific operation performed by the projector 1 of the interactive system of the second embodiment. In the flowchart in FIG. 8, the same processes as those in the flowchart in FIG. 7 are denoted by the same Step numbers. In the interactive system of the second embodiment, processes from Step S27 to Step S29 in the flowchart in FIG. 8 are different from the processes performed by the projector 1 of the interactive system of the first embodiment.

Specifically, at Step S27 in the flowchart in FIG. 8, the physical address receiving unit 50 illustrated in FIG. 5 determines whether a physical address transmitted from a source device connected to the projector 1 via an HDMI cable is received or not. If there is no source device connected to the projector 1 via an HDMI cable (NO at Step S27) the process proceeds to Step S28. If there is a source device connected to the projector 1 via an HDMI cable (YES at Step S27), the process proceeds to Step S24.

At Step S24, an interactive control projection image is distinguished from among the projection images input to input terminals as described above, from the received physical address. If an operation of the pen 4 is detected on the coordinates corresponding to a projection region of the projection image distinguished as above, the position coordinates of the pen 4 is converted to operating information on the coordinate system of the personal computer 2, and transmits the operating information to the personal computer 2. Therefore, interactive control is performed.

In contrast, if it is determined that there is no source device connected to the projector 1 via an HDMI cable and the process proceeds to Step S28, the video input receiving unit 51 determines whether or not there is a source device, such as the personal computer 2, connected via a video input terminal other than the HDMI input terminal. For example, the video input receiving unit 51 determines whether a source device is not connected to an HDMI cable, but connected to a VGA terminal (that is, an analog RGB terminal) via a VGA cable.

If either the HDMI cable or the VGA cable is not connected, this indicates that an image is not currently input to the projector 1 (NO at Step S28). In this case, it is not possible to perform interactive control; therefore, the process in the flowchart in FIG. 8 is terminated.

In contrast, if a VGA cable is connected without connection of an HDMI cable (YES at Step S28), the process proceeds to Step S29. At Step S29 and Step S25, the multiple-screen interactive determining unit 59 determines whether or not the position coordinates of the pen 4 calculated by the position coordinates calculating unit 55 is on the coordinates of a projection region (image area) of a projection image input via the VGA input terminal. If the position coordinates of the pen 4 is not on the coordinates of the projection region of the projection image input via the VGA input terminal (NO at Step S25), the process in the flowchart in FIG. 8 is terminated without performing interactive control.

If the position coordinates of the pen 4 is on the coordinates of the projection region (image area) of the projection image input via the VGA input terminal (YES at Step S25), the process proceeds to Step S26, at which the PC operation coordinate information converting unit 57 generates operating information by converting the calculated position coordinates of the pen 4 to the coordinate system of the personal computer 2, and transmits the operating information to the personal computer 2. Therefore, it becomes possible to perform interactive control on the personal computer 2 in accordance with an operation of the pen on the projection image input to the VGA terminal.

As can be seen from the foregoing, in the interactive system of the second embodiment, if an HDMI cable is not connected and a projection image is input via a different video input terminal, such as a VGA terminal, the interactive system recognizes the projection image input via the different video input terminal as an interactive control projection image, and performs interactive control. Therefore, even when it is difficult to distinguish between a controllable image and an uncontrollable image by using a physical address, it is possible to recognize a projection image input via a different video input terminal, such as a VGA terminal, as a controllable image, and perform interactive control. Further, it is possible to achieve the same advantageous effects as those of the first embodiment.

Third Embodiment

An interactive system of a third embodiment of the present invention will be described below. The above described embodiments are examples, in which a projection image from a source device, such as the personal computer 2, is input to the projector 1 via an HDMI cable or a VGA cable. In contrast, the interactive system of the third embodiment is an example, in which the projector 1 and a source device are connected to each other via a network, and a projection image is input from the source device to the projector 1 via the network. In this case, the projector 1 and the source device are not connected via an HDMI cable. Therefore, as described in the first embodiment, it is difficult to distinguish a control target image from a physical address.

Therefore, in the third embodiment, a source device connected to the projector 1 via a network transmits unique identification information, such as a MAC address or address information assigned in advance by the projector 1, to the projector 1. The projector 1 acquires, as a physical address, the unique identification information provided by the source device via the network. The third embodiment as described below differs from the embodiments as described above only in this point. Therefore, only the difference will be described below, and the same explanation will not be repeated.

FIG. 9 is a sequence diagram illustrating operations in each of devices of the third embodiment. Step S31 and Step S32 illustrated in FIG. 9 differ from the processes in the above described embodiments. Specifically, at Step S31, the personal computer 2 serving as a source device in this example transmits a projection image to the projector 1 via a network. The projector 1 communicates with the source device via the network communication unit 54 illustrated in FIG. 5.

At Step S32, the personal computer 2 transmits unique identification information, such as a MAC address or address information assigned in advance by the projector 1, to the projector 1. The projector 1 recognizes, as a control target image, a projection image to which the unique identification information is added, by using the received unique identification information instead of the physical address, and performs interactive control as described above. Even when a plurality of images from a plurality of source devices connected to a network are collectively projected on a single screen on the projector 1, it is possible to distinguish an interactive control projection image from other projection images, and perform interactive control only when a pointing object, such as the pen 4, is operated on the interactive control projection image. Further, it is possible to achieve the same advantageous effects as those of the above described embodiments.

According to any of the embodiments of the present invention, it is possible to perform interactive control with accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projector comprising:
a processor configured to,
acquire a plurality of projection images from a plurality of source devices, the plurality of source devices including a control target device and at least one non-interactive device, the control target device being configured to perform an operation in response to interactive control performed upon an interactive image provided therefrom, the interactive image being one of the projection images, and the at least one non-interactive device configured to generate a non-interactive image,
acquire identification information for identifying the control target device among the plurality of source devices, the identification information including a physical address associated with the control target device, the physical address indicating whether the source device is a target of an interactive function,
identify, out of the plurality of projection images acquired from the plurality of source devices, the interactive image based on the physical address such that the processor is configured to distinguish between which of the plurality of source devices provides the interactive function,
generate a composite image, in which the acquired projection images are collected into a single image,
project the composite image on a projection plane,
detect position coordinates of a pointing object that operates on the projection plane,
detect a projection region of a projection image provided by the control target device in the composite image such that the processor distinguishes between a first projection region displaying the interactive image and a second projection region displaying the non-interactive image based on the acquired identification information, and to limit interaction with the pointing object to within the first projection region, convert the position coordinates of the pointing object to operating information on a coordinate system of the control target device, if the position coordinates of the pointing object are in the first projection region of the projection image, and selectively transmit the operating information to the control target device such that the processor is configured not to transmit the operation information to the control target device when the position coordinates of the pointing object is the second projection region displaying the non-interactive image.

2. The projector according to claim 1, wherein the processor is configured to, acquire the physical address assigned to each of the source devices connected via a cable, and distinguish the control target device based on the physical address.

3. The projector according to claim 1, further comprising:
a video graphics array (VGA) input terminal, and wherein
the processor is configured to detect the first projection region of the projection image, if the processor acquires the projection image via the VGA input terminal.

4. The projector according to claim 1, wherein the processor is configured to, acquire the projection image via a network, and acquire, via the network, one of a media access control (MAC) address of each of the source devices and address information assigned to each of the source devices as the identification information.

5. An interactive system comprising:

the projector of claim 1, the projector configured to detect the position coordinates of the pointing object based on measurement information; and the pointing object, the pointing object configured to transmit the measurement information to the projector.

6. An interactive control method comprising:

acquiring a plurality of projection images from a plurality of source devices, the plurality of source devices including a control target device and at least one non-interactive device, the control target device being configured to perform an operation in response to interactive control performed upon an interactive image provided therefrom, the interactive image being one of the projection images, and the at least one non-interactive device configured to generate a non-interactive image;

acquiring identification information for identifying the control target device, among the plurality of source devices, the identification information including a physical address associated with the control target device, the physical address indicating whether the source device is a target of an interactive function;

identifying, out of the plurality of projection images acquired from the plurality of source devices, the interactive image based on the physical address to distinguish between which of the plurality of source devices provides the interactive function;

generating a composite image, in which the acquired projection images are collected into a single image;

projecting the composite image on a projection plane;

detecting position coordinates of a pointing object that operates on the projection plane;

detecting a projection region of a projection image provided by the control target device in the composite image to distinguish between a first projection region displaying the interactive image and a second projection region displaying the non-interactive image based on the acquired identification information, and to limit interaction with the pointing object to within the first projection region;

converting the position coordinates of the pointing object to operating information on a coordinate system of the control target device, if the position coordinates of the pointing object are in the first projection region of the projection image; and selectively transmitting the operating information to the control target device such that the selectively transmitting does not transmit the operation information to the control target device when the position coordinates of the pointing object is the second projection region displaying the non-interactive image.

7. The interactive system of claim 5, wherein the pointing object is configured to, measure pattern information projected by the projector in the projection plane; and generate the measurement information based on the pattern information.

8. The projector according to claim 1, wherein the processor is configured not to acquire the identification information including the physical address from the at least one non-interactive device such that the processor is configured to determine which of the plurality of source devices is the control target device based on whether the processor acquired the physical address from an associated one of the plurality of source devices.

9. The interactive control method according to claim 6, wherein the acquiring does not acquire the identification information including the physical address from the at least one non-interactive device and determines which of the plurality of source devices is the control target device based on whether the physical address is acquired from an associated one of the plurality of source devices.

* * * * *